United States Patent Office 3,657,288
Patented Apr. 18, 1972

3,657,288
CYCLOBUTANONES AND PROCESS FOR THE PREPARATION THEREOF
Rudolf Wiechert, Berlin, Germany, assignor to Schering Aktiengesellschaft, Berlin, Germany
No Drawing. Filed Mar. 2, 1970, Ser. No. 15,884
Claims priority, application Germany, Mar. 6, 1969,
P 19 12 236.2; July 18, 1969, P 19 37 613.7
Int. Cl. C07c *169/22*
U.S. Cl. 260—397.3     22 Claims

ABSTRACT OF THE DISCLOSURE

Cyclobutanones of the formula

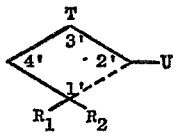

wherein $R_1$ and $R_2$ each are alkyl or cycloalkyl groups or, collectively with the 1'-carbon atom of the cyclobutanone ring, a monocyclic or polycyclic cycloalkyl group, e.g., a spirosteroidal group attached by its 17-position carbon atom, and one of T and U is an oxygen atom and the other are two hydrogen atoms, are produced by reacting an α-chloro- or α-bromo-ketone of the formula

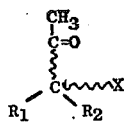

wherein $R_1$ and $R_2$ have the values given above and X is Cl or Br, with dimethylmethylene sulfonium oxide.

BACKGROUND OF THE INVENTION

This invention relates to novel cyclobutanones and to a process for the production thereof.

In the process of this invention, cyclobutanones are produced by the reaction of an α-haloketone as defined herein with dimethylmethylene sulfonium oxide.

It is surprising that cyclobutanones are produced in the reaction of α-haloketones with dimethylmethylene sulfonium oxide, since it is known that ketones form oxiranes with dimethylmethylene sulfonium oxide. See J. Am. Chem. Soc., 84 (1962), pp. 867–868. Thus, one might expect that an α-haloketone would produce an α,β-unsaturated ketone, by splitting off hydrogen halide, which would be methylenated to a cyclopropyl ketone. The formation of cyclobutanones could not be predicted, since it is generally known that the tendency to form four-membered rings is slight.

SUMMARY OF THE INVENTION

According to this invention, cyclobutanones of the formula

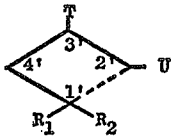

(I)

wherein $R_1$ and $R_2$ individually are alkyl or cycloalkyl groups or, collectively, with the adjacent 1'-carbon atom of the cyclobutane ring, are a monocyclic or polycyclic cycloalkyl group; and one of T and U is an oxygen atom and the other two hydrogen atoms; are produced by reacting a methyl-α-chloro- or α-bromoketone of the formula

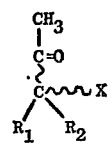

(II)

wherein $R_1$ and $R_2$ have the values given above and X is chlorine or bromine, with dimethylmethylene sulfonium oxide.

OBJECTS OF THE INVENTION

It is an object of this invention to provide novel cyclobutanones. It is another object to provide novel steroidal spirobutanones. It is a further object to provide a process for the production of cyclobutanones from methyl α-haloketones. Other objects will be apparent to those skilled in the art to which this invention pertains.

DETAILED DISCUSSION OF THE INVENTION

The products of this invention have the Formula I in which $R_1$ and $R_2$ each are alkyl or cycloalkyl or, collectively with the 1'-position carbon atom of the cyclobutane ring, are a spirocyclic ring. Examples of such alkyl groups are straight and branched chain alkyl containing 1 to 8 carbon atoms, preferably 1 to 4 carbon atoms, e.g., methyl, ethyl, propyl, iso-propyl, n-butyl, iso-butyl, sec.-butyl, etc. Examples of cycloalkyl are those containing a total of 3 to 30 carbon atoms, preferably 3 to 22 carbon atoms, and from 3 to 10, preferably 5 or 6 ring carbon atoms, e.g., cyclopropyl, cyclobutyl, cyclopentyl, cyclohexyl, cycloheptyl, alkylated cycloalkyl, wherein the cycloalkyl-ring bears from 1 to 4 alkyl, preferably lower-alkyl groups, e.g., 2-methylcyclopentyl, 2,5-dimethylcyclopentyl, 3-ethylcyclopentyl and 4-methylcyclohexyl. The cycloalkyl group can also be polycyclic, e.g., contain from 2 to 4 rings which preferably are fused, e.g., p-dicyclohexyl, octahydroindenyl, α- and β-decahydronaphthyl, α- and β-perhydroanthracyl, perhydrophenanthryl, cyclopentanoperhydrophenanthryl, etc. The cycloalkyl group can also be bridged by an alkylene group containing, e.g., 1–4 carbon atoms, e.g., hexahydrobenzyl, cyclohexylethyl, etc. The alkyl, cycloalkyl and spirocycloalkyl groups can also bear substituents, e.g., hydroxy, benzyloxy, lower-alkoxy, e.g., methoxy, acyloxy, e.g., and other lower-alkanoyloxy, benzoxy and other aryl acyloxy, preferably carbocyclic aryl acyloxy, non-conjugated and conjugated double bonds, fluoro and other halo, epoxy, cyano, sulfato, phosphato, etc.

A novel class of cyclobutanones produced by the process of this invention are steroid-spirocyclobutanones of the formula

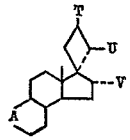

(Ia)

wherein V is hydrogen or methyl, T and U have the values given, and A is one of the following structures:

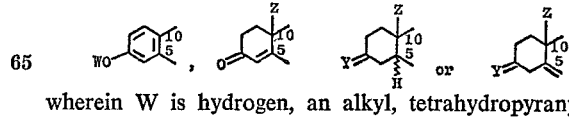

wherein W is hydrogen, an alkyl, tetrahydropyranyl or acyl, Z is hydrogen or methyl, and Y is

in which R is alkyl or acyl, preferably lower-alkyl or lower-alkanoyl.

Of the above steroid spirocyclobutanones, preferred are those of Formula Ia wherein:

(a) T=O and U=H₂

(b) V is methyl (c) A is 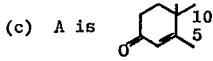

(d) A is 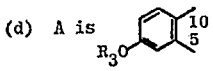

in which R₃ is H or acyl, preferably lower-aliphatic acyl, e.g., acetyl;

(e) A is 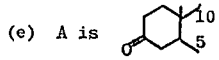

(f) A is 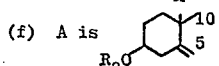

in which R₃ has the value given above.

These steroid-spirocyclobutanones (Ia) are valuable intermediates for the synthesis of a wide variety of types of compounds and thus are useful as intermediates for the preparation of steroidal medicines. For examples, steroid-spirocyclobutanones (Ia) can be converted, e.g., by oxidation, into the corresponding steroid-spirolactones of the formula:

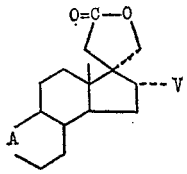

in which V has the meaning given above. The oxidation may be performed with percarboxylic acids, e.g. with perbenzoic acid at room temperature.

Steroid-spirolactones are usueful in the treatment of cardiac insufficiency. The steroid-spirocyclobutanones themselves also possess pharmacological activity. For example, (17S)-spiro (4-androstene-17,1'-cyclobutane)-3,2'-dione and spiro(4-androstene - 17,1' - cyclobutane)-3,3'-dione exhibit, in animal tests on male rats, a strong inhibitory effect on testes and prostate, i.e., they possess anti-androgenic activity. In female rats, 16α-methyl-spiro (4-androstene-17,1'-cyclobutane)-3,3'-dione has an ovulation-inhibiting effect upon oral administration, i.e., it possesses oral contraceptive activity.

Preferred starting compounds of the steroid series are 17-halo-20-ketopregnanes. The pregnane structure can be substituted, for example, by alkyl groups and free or functionally modified hydroxy groups. Keto groups can be contained therein. Reactive keto groups, sucuh as saturated 3-ketones or unsaturated Δ¹-3-ketones, should be blocked prior to the reaction, for example by ketalization, to avoid side reactions.

Examples of substituents which can be present in the steroid molecule are methyl, ethyl or other lower-alkyl group at one or more of the 2, 4, 6, 11, 12, 16 and 19 positions; fluorine at one of more of the 2, 6, 7, 9 and 16 positions; hydroxy at the 11 and/or 16 positions; a double bond at one or more of the 1, 4, 6, 8 (14) and 9 (11) positions; a Δ⁴-3-keto or Δ¹,⁴-3-keto group; a Δ⁵-3β-hydroxy or -acyloxy group; a Δ¹,³,⁵(¹⁰)-3-hydroxy or -acyloxy group; etc.

The process of this invention for the preparation of cyclobutanones takes place under surprisingly mild conditions. It is generally sufficient to allow the reaction components to stand for some time at room temperature or at a slightly elevated temperature in an inert solvent. In general, ½ to 5 hours reaction time are sufficient. The temperature generally ranges from 0 to 80° C. but lower or higher temperatures can be employed. In order to purify the mixture of isomeric cyclobutanones, produced by the cyclization, customary methods can be employed, such as sublimation, chromatography and crystallization.

The dimethylmethylene sulfonium oxide employed as the reactant can be produced from a trimethyl sulfoxonium salt, such as, for example, the halogenide, perchlorate, or methyl sulfate, in an aprotic solvent, e.g., dimethyl sulfoxide or dimethyl formamide, with an anhydrous base at room temperature. In conducting the process of this invention, it is advantageous not to isolate the dimethylmethylene sulfonium oxide from the reaction solution, but instead to use the reaction solution for the reaction with the starting α-haloketone. Preferred solvents in the reaction of this invention thus are dimethyl sulfoxide and dimethylformamide. However, other aprotic solvents are suitable, e.g., dimethyl acetamide, hexamethylphosphoric triamide, N-methylpyrrolidone, etc.

The tertiary α-haloketones of Formula II used as starting materials in the process of this invention are known and are readily available. Thus, the cyclobutanone products of the process of this invention which, as a class, were heretofore produced with difficulty are made readily accessible by the process of this invention. Certain classes of such compounds, e.g., the steroid-spirocyclobutanones of Formula Ia, have been obtained for the first time by the novel process.

The cyclization reaction of this invention can produce a mixture of isomers, i.e., the keto group in the cyclobutane ring can be at the 2'- or 3'-position, depending on the manner in which ring closure occurs. Thus, when a 17α-halo-20-keto steroid is employed as a starting material, the reaction product is a mixture of cyclobutan-3'-one (T=O, U=H₂) and cyclobutan-2'-one (T=H₂, U=O) isomers which can be separated in a conventional manner, e.g., by chromatography and/or fractional recrystallization.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

21.05 g. of trimethyl sulfoxonium iodide is mixed, in 363 ml. of dimethyl sulfoxide, with 3.83 g. of sodium hydroxide and stirred in a nitrogen atmosphere for 25 minutes at room temperature. Then, 14.55 g. of 17-chloro-3β-hydroxy-16α-methyl-5-pregnen-20-one is added, and the reaction mixture is stirred for 1.5 hours at 40° C. After stirring into weak acetic acid-ice water, the precipitate is filtered off, washed neutral, taken up in methylene chloride, and dried. After evaporating the reaction mixture to dryness, 3β-hydroxy-16α-methyl-spiro (5-androstene-17,1'-cyclobutan)-3'-one is obtained. The latter compound is acetylated in 60 ml. of pyridine with 30 ml. of acetic anhydride at room temperature. The reaction mixture is then poured into ice water, and the precipitate is vacuum-filtered, washed, and dried. After chromatography on silica gel and recrystallization from isopropyl ether, 8.5 g. of 3β-acetoxy-16α-methyl-spiro(5-androstene-17,1'-cyclobutan)-3'-one is obtained, M.P. 189.5–191° C. $(\alpha)_D^{24°} = -127°$ (chloroform).

EXAMPLE 2

2.2 g. of 17-chloro-3β-hydroxy-16α-methyl-17α-pregnen-5-en-20-one is stirred for 1 hour at 40° C. in 50 ml. of dimethyl sulfoxide with dimethylmethylene sulfonium oxide (produced from 3.16 g. of trimethyl sulfoxonium iodide and 576 mg. of sodium hydroxide). The working up and the acetylation of the reaction mixture containing the thus-produced 3β-hydroxy - 16α - methylspiro(5-androstene-17,1'-cyclobutan)-3-one are conducted as set forth in Example 1. After chromatography on silica gel and recrystallization from isopropyl ether, 950 mg. of 3β-acetoxy-16α-methyl-spiro(5-androstene - 17,1' - cyclobutan)-3'-one is obtained, M.P. 188.5–190.5° C.

$(\alpha)_D^{24°} = -125°$ (chloroform).

EXAMPLE 3

3.0 g. of 17-bromo-3β-hydroxy - 16α - methyl-5-pregnen-20-one is stirred for 75 minutes at 40° C. in 75 ml. of dimethyl sulfoxide with dimethylmethylene sulfonium oxide (produced from 3.21 g. of trimethyl sulfoxonium iodide and 692 mg. of sodium hydride (50% oil suspension)). The working-up, acetylating, and purifying steps are conducted as described in Example 1, thus obtaining 1.2 g. of 3β-acetoxy - 16α - methyl-spiro(5-androstene-17,1'-cyclobutan)-3'-one, M.P. 189–190.5° C.

EXAMPLE 4

3.0 g. of 17-bromo-3β-acetoxy - 5α - pregnan-20-one is stirred for 1 hour at room temperature in 75 ml. of dimethyl sulfoxide with dimethylmethylene sulfonium oxide (prepared from 2.94 g. of trimethyl sulfoxonium iodide and 535 mg. of sodium hydroxide). The working-up and purification steps are conducted analogously to Example 1. After recrystallization from isopropyl ether, 3β-acetoxy-spiro(5α-androstane-17,1'-cyclobutan)-3'-one is obtained, M.P. 200.5–202° C.

EXAMPLE 5

1.0 g. of 17-chloro-3β-acetoxy - 5α - pregnan-20-one is reacted in 25 ml. of dimethyl sulfoxide, as described in Example 1, and worked up. After chromatography on silica gel and recrystallization from isopropyl ether, 3β-acetoxy-spiro(5α-androstane-17,1'-cyclobutan) - 3'-one is obtained, M.P. 200.5–201.5° C.

EXAMPLE 6

40 g. of 2-bromo-2-methylbutan-3-one is reacted and worked up as described in Example 1. After distillation, 3,3-dimethylcyclobutan-1-one is obtained (boiling point 121–123° C.).

EXAMPLE 7

10 g. of 1-bromocyclohexyl methyl ketone is reacted and worked up as set forth in Example 1, thus obtaining spiro(3,5)-nonan-2-one.

EXAMPLE 8

27 g. of 17-bromo-3-methoxy - 19 - nor-1,3,5(10)-pregnatrien-20-one is reacted in 600 ml. of dimethyl sulfoxide with 30.36 g. of trimethyl sulfoxonium iodide and 5.52 g. of sodium hydroxide, as described in Example 1, and worked up. After chromatography on silica gel and recrystallization from isopropyl ether, 1.2 g. of 3-methoxy-spiro(1,3,5(10)-androstatriene - 17,1' - cyclobutan)-3'-one is obtained, M.P. 137–138.5° C.

EXAMPLE 9

10 g. of 17-chloro-16α-methyl - 4 - pregnene-3,20-dione is reacted in 250 ml. of dimethyl sulfoxide with dimethylmethylene sulfonium oxide, analogously to Example 1, for 1.5 hours at 40° C., and worked up. After chromatographing on silica gel and recrystallization from isopropyl ether, 4.5 g. of 16α-methyl-spiro(4-androstene-17,1'-cyclobutane)-3,3'-dione is obtained, M.P. 143.5–145.5° C. UV: $\epsilon_{240}=16,900$.

EXAMPLE 10

1.0 g. of 17-chloro-3-methoxy - 16α - methyl-1,3,5(10)-19-nor-pregnatrien-20-one is reacted in dimethyl sulfoxide with dimethylmethylene sulfonium oxide for 1.5 hours at room temperature, analogously to Example 1, and worked up. After chromatography on silica gel and recrystallization from ethyl acetate, 580 mg. of 3-methoxy-16α-methyl-spiro(1,3,5(10)-estratriene - 17,1' - cyclobutan)-3'-one is obtained, M.P. 190.5–192.5° C.

EXAMPLE 11

25 g. of 17-bromo-3-methoxy-1,3,5(10 - 19 - nor-pregnatrien-20-one is reacted, analogously to Example 1, in dimethyl sulfoxide with dimethylmethylene sulfonium oxide for 1.5 hours at room temperature, and worked up. After chromatography on silica gel and recrystallization from isopropyl ether, 960 mg. of 3-methoxy-spiro-(1,3,5(10)-estratriene-17,1'-cyclobutan) - 3' - one is obtained, M.P. 137–138.5° C.

EXAMPLE 12

3.0 g. of 17-bromo - 3β - acetoxy-5α-pregnan-20-one is stirred for 1 hour at room temperature in 75 ml. of dimethyl sulfoxide with dimethylmethylene sulfonium oxide, produced from 2.94 g. of trimethyl sulfoxonium iodide and 535 mg. of sodium hydroxide. After stirring the reaction mixture into weak acetic acid-ice water, the precipitate is filtered off, washed neutral, taken up in methylene chloride, and dried. The residue obtained after evaporation is chromatographed on silica gel. After recrystallization from isopropyl ether, 440 mg. of (17S)-3β-acetoxy-spiro(5α-androstane - 17,1' - cyclobutan)-2'-one is obtained, M.P. 162–164° C.

After a further elution of the column and recrystallization from isopropyl ether, 195 mg. of 3β-acetoxy-spiro-(5α-androstane-17,1'-cyclobutan) - 3' - one is obtained, M.P. 200.5–201.5° C.

EXAMPLE 13

32 g. of 17-bromo-3β-acetoxy - 5 - pregnan-20-one is stirred for 1.5 hours at room temperature in 716 ml. of dimethyl sulfoxide with dimethylmethylene sulfonium oxide, produced from 32.05 g. of trimethyl sulfoxonium iodide and 5.83 g. of sodium hydroxide. Then the reaction mixture is worked up analogously to Example 12. After chromatography on silica gel and recrystallization from isopropyl ether, 7.4 g. of (17S)-3β-acetoxy-spiro (5-androstene-17,1'-cyclobutan)-2'-one is obtained, M.P. 187–188.5° C.

After a further elution of the column and recrystallization from isopropyl ether, 2.7 g. of 3β-acetoxy-spiro-(5-androstene-17,1'-cyclobutan)-3'-one is obtained, M.P. 233–235° C.

EXAMPLE 14

3.95 g. of 17-bromo - 4 - pregnene-3,20-dione is stirred for 1.5 hours at room temperature in 115 ml. of dimethyl sulfoxide with dimethylmethylene sulfonium oxide, produced from 4.4 g. of trimethyl sulfoxonium iodide and 800 mg. of sodium hydroxide, and worked up as described in Example 12. After chromatography on silica gel and recrystallization from isopropyl ether, 380 mg. of (17S)-spiro(4-androstene - 17,1' - cyclobutane)-3,2'-dione is obtained, M.P. 169–177° C.

UV: $\epsilon_{241}=16,600$.

After a further elution of the column and recrystallization from isopropyl ether, 165 mg. of spiro(4-androstene - 17,1' - cyclobutane)-3,3'-dione is obtained, M.P. 150.5–152° C.

UV: $\epsilon_{241}=16,600$.

Following the procedure of Examples 4 and 5, 3β-hydroxy-17-bromo- and -17-chloro - 5α - pregnan-20-one are converted to 3α-hydroxy-spiro-(5α-androstane-(17,1'-cyclobutan)-3'-one.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Steroid-spirocyclobutanones of the formula

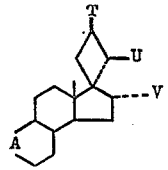

wherein V is hydrogen or methyl, T and U are different members of the group consisting of an oxygen atom or two hydrogen atoms, and A is one of the structures:

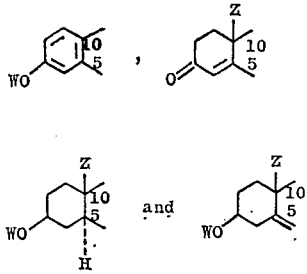

wherein W is hydrogen, lower-alkyl or lower-alkanoyl and Z is hydrogen or methyl.

2. A compound of claim 1 wherein A is

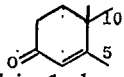

3. A compound of claim 1 wherein A is

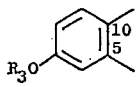

in which $R_3$ is H or lower-alkanoyl.

4. A compound of claim 1 wherein A is

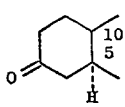

5. A compound of claim 1 wherein A is

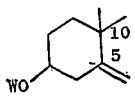

wherein W is H or lower-alkanoyl.

6. A compound of claim 1, 3β-hydroxy-16α-methyl-spiro(5-androstene-17,1'-cyclobutan)-3'-one.

7. A compound of claim 1, 3β-acetoxy-16α-methyl-spiro(5-androstene-17,1'-cyclobutan)-3'-one.

8. A compound of claim 1, 3β-hydroxy-spiro(5α-androstane-17,1'-cyclobutan)-3'-one.

9. A compound of claim 1, 3β-acetoxy-spiro(5α-androstane-17,1'-cyclobutan)-3'-one.

10. A compound of claim 1, 16α-methyl-spiro(4-androstene-17,1'-cyclobutane)-3,3'-dione.

11. A compound of claim 1, 3-methoxy-16α-methyl-spiro(1,3,5(10)-estratriene-17,1'-cyclobutan)-3'-one.

12. A compound of claim 1, 3-methoxy-spiro(1,3,5(10)-estratriene-17,1'-cyclobutan)-3'-one.

13. A compound of claim 1, (17S)-3β-acetoxy-spiro(5α-androstane-17,1'-cyclobutan)-2'-one.

14. A compound of claim 1, (17S)-3β-acetoxy-spiro(5-androstene-17,1'-cyclobutan)-2'-one.

15. A compound claim 1, (17S)-spiro(4-androstene-17,1'-cyclobutane)-3,2'-dione.

16. A compound of claim 1, 3β-acetoxy-spiro(5-androstene-17,1'-cyclobutane)-3'-one.

17. A compound of claim 1, (17S)-spiro(4-androstene-17,1'-cyclobutane)3,2'-dione.

18. A process for the preparation of cyclobutanones of the formula

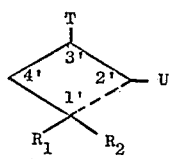

wherein $R_1$ and $R_2$ each are alkyl or a cycloalkyl group or, collectively with the carbon atom of the cyclobutane ring to which they are attached, a cycloalkyl group and T and U are different members of the group consisting of an oxygen atom and two hydrogen atoms, which comprises reacting am ethyl tertiary α-haloketone of the formula

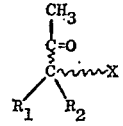

wherein $R_1$ and $R_2$ have the values given above, and X is chlorine or bromine, with dimethylmethylene sulfonium oxide.

19. A process according to claim 18 for the preparation of steroid-spirocyclobutanones of the formula

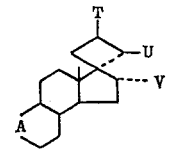

wherein V is hydrogen or methyl, T and U are different members of the group consisting of an oxygen atom or two hydrogen atoms, and A is one of the structures:

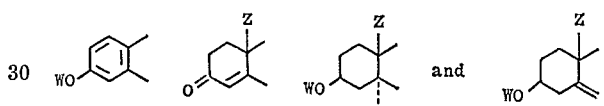

wherein W is hydrogen, lower-alkyl or lower-alkanoyl and Z is hydrogen or methyl, which comprises reacting a 17-halo-20-keto-pregnane of the formula

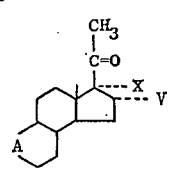

wherein V and A have the values given above and X is chlorine or bromine, with dimethylmethylene sulfonium oxide.

20. A process according to claim 19 which comprises the step of separating from the thus-obtained reaction mixture the thus-produced cyclobutan-3'-one and cyclobutan-2'-one isomers.

21. A process according to claim 19 wherein the starting material is selected from the group consisting of 17-chloro - 3β - hydroxy - 16α-methyl-5-pregnen-20-one, 17-chloro-3β-hydroxy-16α-methyl - 17α-pregnen-5-en-20-one, 17-bromo-3β-hydroxy - 16α - methyl-5-pregnen-20-one, 17-bromo-3β-acetoxy-5α-pregnan-20-one, 17-chloro-3β-acetoxy-5α-pregnan-20-one, 17-bromo-3-methoxy-19-nor-1,3,5(10)-pregnatrien-20-one, 17-chloro-16α-methyl-4-pregnene - 3,20-dione, 17-chloro-3-methoxy-16α-methyl-1,3,5(10)-pregnatrien-20-one, and 17-bromo-3-methoxy-1,3,5(10)-pregnatrien-20-one.

22. A process according to claim 18 wherein 2-bromo-2-methylbutan-3-one or 1-bromocyclohexyl methyl ketone is employed as the starting material.

No references cited.

HENRY A. FRENCH, Primary Examiner

U.S. Cl. X.R.

260—239.55 R, 239.55 C, 397.4, 999

UNITED STATES PATENT OFFICE
CERTIFICATE OF CORRECTION

Patent No. 3,657,288          Dated April 18, 1972

Inventor(s) Rudolf Wiechert

It is certified that error appears in the above-identified patent and that said Letters Patent are hereby corrected as shown below:

IN THE CLAIMS:

CLAIM 18, COLUMN 8, LINE 5:    "am ethyl" should read -- a methyl --

Signed and sealed this 9th day of April 1974.

(SEAL)
Attest:

EDWARD M. FLETCHER, JR.　　　　　　　　C. MARSHALL DANN
Attesting Officer　　　　　　　　　　　　　Commissioner of Patents